United States Patent [19]

Uehara

[11] Patent Number: 4,987,506

[45] Date of Patent: Jan. 22, 1991

[54] CLAMPING MECHANISM FOR CLAMPING A MOVABLE CARRIAGE CARRYING A RECORDING/REPRODUCING HEAD OF AN INFORMATION RECORDING/REPRODUCING APPARATUS

[75] Inventor: Keiji Uehara, Iruma, Japan

[73] Assignee: Teac Corporation, Japan

[21] Appl. No.: 291,518

[22] Filed: Dec. 29, 1988

[30] Foreign Application Priority Data

Jan. 8, 1988 [JP] Japan ............................ 63-871[U]
Oct. 5, 1988 [JP] Japan ...................... 63-130620[U]

[51] Int. Cl.$^5$ .......................... G11B 5/54; G11B 5/55; G11B 17/04
[52] U.S. Cl. ................................. 360/105; 360/106; 360/99.06
[58] Field of Search ................. 360/105, 99.06–99.09, 360/99.02, 96.6, 106

[56] References Cited

U.S. PATENT DOCUMENTS

| | | | |
|---|---|---|---|
| 4,331,989 | 6/1982 | Viskochil | 360/97 |
| 4,583,142 | 4/1986 | Skarky | 360/105 |
| 4,725,907 | 2/1988 | Jue | 360/105 |
| 4,760,476 | 7/1988 | Hasegawa et al. | 360/97 |
| 4,796,130 | 1/1989 | Shimanuki | 360/105 |
| 4,833,553 | 6/1989 | Noda et al. | 360/99.06 |

FOREIGN PATENT DOCUMENTS 146968 9/1985 Japan .
182569 9/1985 Japan .
197984 10/1985 Japan .

Primary Examiner—A. J. Heinz
Assistant Examiner—Jefferson Evans
Attorney, Agent, or Firm—Andrus, Sceales, Starke & Sawall

[57] ABSTRACT

A clamping mechanism for clamping a carriage of an information recording/reproducing apparatus recording and/or reproducing an information signal on and from a disk-shaped rotary recording medium accommodated in a cartridge comprises a clamping device provided movably on the body of the recording/reproducing apparatus between a clamped state in which the clamping device is engaged with the carriage so that the cartridge is fixed to the clamping device and a released state in which the clamping member is disengaged from the carriage so that the cartridge is free to move relative to the clamping device, and an actuation device provided movably on the body of the recording/reproducing apparatus between a first state and a second state such that the actuation device urges the clamping device to the clamped state when the actuation device is in the first state and the actuation device urges the clamping device to the released state when the actuation device is in the second state.

11 Claims, 9 Drawing Sheets

CLAMPING MECHANISM FOR CLAMPING A MOVABLE CARRIAGE CARRYING A RECORDING/REPRODUCING HEAD OF AN INFORMATION RECORDING/REPRODUCING APPARATUS

BACKGROUND OF THE INVENTION

The present invention generally relates to clamping mechanisms for clamping a movable carriage carrying a recording/reproducing head of an information recording/reproducing apparatus which records and/or reproduces an information signal on and from a disk-shaped rotary recording medium, and particularly to a clamping mechanism used in such an information recording/reproducing apparatus for restricting a movement of the carriage during transport of the apparatus or during a time in which the apparatus is not used.

An information recording/reproducing apparatus referred to hereinafter simply as an apparatus used for recording and/or reproducing an information signal on and from a disk-shaped rotary information recording medium generally has a carriage on which an information recording/reproducing head such as a magnetic or optical head is provided. The carriage is movable along a radial direction of the information recording medium and transports the head along a radial direction of the disk-shaped rotary information recording medium referred to hereinafter simply as a disk and the recording or reproducing is made along a spiral or concentric track defined on the disk.

As the tracks defined on the disk are separated each other by an extremely minute distance in the order of microns or less, the carriage has to move the recording/reproducing head carried thereon with an extreme precision. For such a carriage, external shock or vibration such as the one applied at the time of transportation or delivery of the apparatus is naturally harmful. Because of this, the information recording/reproducing apparatus has a clamping mechanism for preventing the movement of the carriage during the transportation or delivery of the apparatus.

Conventional clamping mechanism may be classified into following categories:

(1) A screw connecting the carriage to a chassis of the apparatus when tightened at the time of transport or delivery of the apparatus. When tightened, the screw firmly fixes the carriage to the chassis while when performing the recording or reproducing operation, the screw has to be removed from the carriage.

(2) A clamping mechanism comprising a swing lever rotated between a first position in which the carriage is clamped and a second position in which the clamp of the carriage is released, and a clamp pin on the swing lever which engages with a corresponding depression defined on the carriage when the lever is in the first position and which disengages from the depression when the lever is in the second position.

(3) A clamping mechanism comprising an electromagnetic solenoid which clamps the carriage by a clamping member connected thereto when the electromagnetic solenoid is deenergized and releases the clamp when the solenoid is energized.

However, the first mentioned clamping mechanism has a problem in that, once the screw is removed, the carriage cannot be clamped unless the screw is re-mounted manually by the user. Such a re-mounting of the clamping screw on the apparatus is a tedious work as the user has to move the carriage to a predetermined position ready for screwing the carriage on the chassis of the apparatus in which the screw is accepted in a grooved hole in the chassis through a penetrating hole in the carriage. Further, the screw is often lost during the time in which the screw is removed.

Further, there is a problem in the first and second clamping mechanisms that the user sometimes forgets the removal of the screw or rotation of the lever to the second position. When such a situation arises, the head carriage does not move in spite of the operation of the apparatus and the user may mistakenly decide that the apparatus is in failure. In the third clamping mechanism, there is a problem that the cost of the mechanism is increased as a result of the use of expensive electromagnetic solenoid and that the electrical power consumed by the apparatus is increased when operating the apparatus.

SUMMARY OF THE INVENTION

Accordingly, it is a general object of the present invention to provide a novel and useful clamping mechanism wherein the aforementioned problems are eliminated.

Another and more specific object of the present invention is to provide a clamping mechanism for clamping and releasing a carriage carrying a recording/reproducing head of a recording/reproducing apparatus designed for recording and/or reproducing an information signal on and from a disk-shaped rotary recording medium, wherein the clamping and releasing can be performed without manipulating the clamping mechanism by a human hand.

Another object of the present invention is to provide a clamping mechanism wherein engagement and disengagement of the clamping mechanism on and from a carriage carrying the recording/reproducing head is performed reliably.

Another object of the present invention is to provide a clamping mechanism for clamping and releasing a carriage provided movably in a recording/reproducing apparatus designed for recording and/or reproducing an information signal on and from a disk-shaped rotary recording medium by means of a recording/reproducing head carried by the carriage, comprising a clamping member adapted to be engaged with the carriage when the recording medium is not loaded on the apparatus so that the movement of the carriage is prevented, and releasing member actuated responsive to a loading of the disk-shaped rotary recording medium for displacing the clamping member such that the clamping applied to the carriage by the clamping member is released. According to the present invention, the carriage is clamped by the clamping member when the recording medium in not loaded on the apparatus. When the recording medium is loaded, on the other hand, the clamping member is displaced by the releasing member and the clamping of the carriage is released. Thus, the carriage is protected effectively from external vibrations and shocks without complicated and tedious clamping procedure hitherto required and the clamp can be easily released again. Further, the clamping mechanism of the present invention eliminates the need to use electromagnetic solenoid and thus the mechanism can be constructed cheaply. Further, the excessive consumption of electrical power as a result of use of the electromagnetic solenoid is eliminated.

Still other objects and further features of the present invention will become apparent from the following detailed description on preferred embodiments of the present invention when read in conjunction with attached drawings.

DETAILED DESCRIPTION

Figure 1:
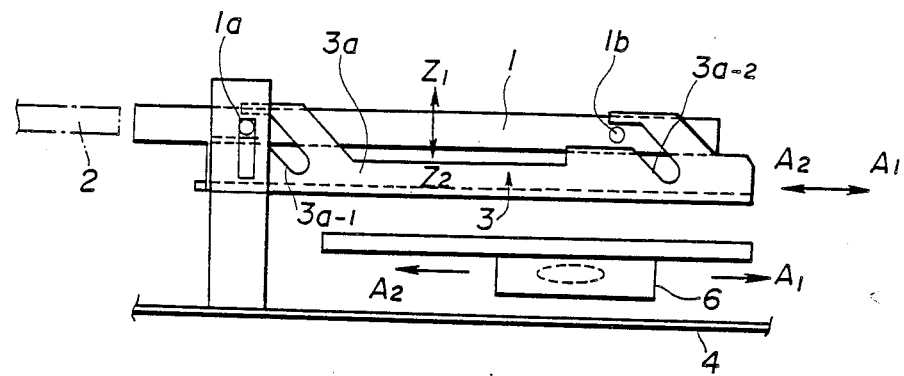
FIGS. 1(A) and (B) are side views showing a part of an information recording/reproducing apparatus for recording and/or reproducing an information signal on and from an information recording disk to which the present invention is applicable.
Figure 1:
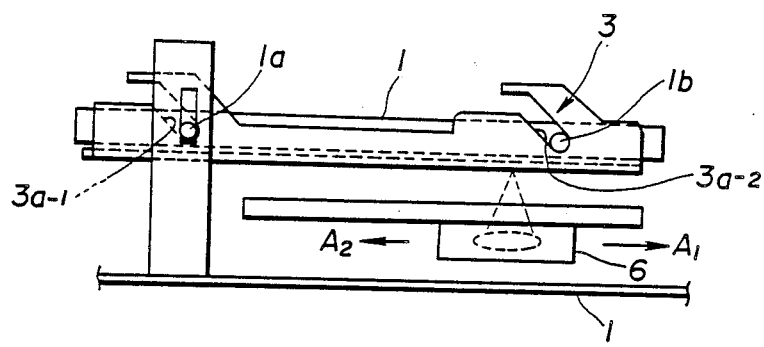

FIGS. 1(A) and (B) show a part of a recording/reproducing apparatus (apparatus) for recording and/or reproducing an information signal on and from a disk-shaped rotary recording medium (disk) pertinent to the subject matter of the present invention schematically. Referring to the drawings, the apparatus comprises a holder 1 adapted to receive a cartridge 2 which in turn accommodates an optical disk therein and a slider 3 provided movably in A1 and A2 directions in a body 4 of the apparatus. The holder 1 has pins 1a and 1b projecting laterally from its side wall and these pins are accepted in corresponding oblique cutouts 3a-1 and 3a-2 formed on a side wall 3a of the slider 3. The side wall 3a of the slider 3 is located adjacent to and outside of the side wall of the holder 1. Thus, the holder 1 is held by the slider 3 and is moved in Z1 and Z2 directions responsive to the movement of the slider 3 in the A1 and A2 directions. The cartridge 2 has a window (not shown) on its lower side which is closed by a shutter 5 (FIG. 2) when the cartridge is not in the holder 1. FIG. 1(A) shows a state of the holder 1 waiting for insertion of the cartridge 2 thereto and FIG. 1(B) shows a state in which the holder 1 accommodating the inserted cartridge 2 is moved to a position in which the recording and/or reproduction of the information signal on and from the disk is performed.

Further, a carriage 6 including an optical head which is schematically illustrated in a form of a lens is disposed below the slider 3 in a manner movable in a radial direction of the disk indicated by arrows A1 and A2. The optical head is an optical system including an optical source for producing the optical beam, various optical elements including an objective lens for guiding and focusing the optical beam on a recording surface of the optical disk on which the information signals are recorded, and detectors for detecting the optical beam irradiated on the surface of the disk and reflected back therefrom. The optical head is carried by the carriage 6 and is movable in the A1 and A2 directions.

Figure 2:
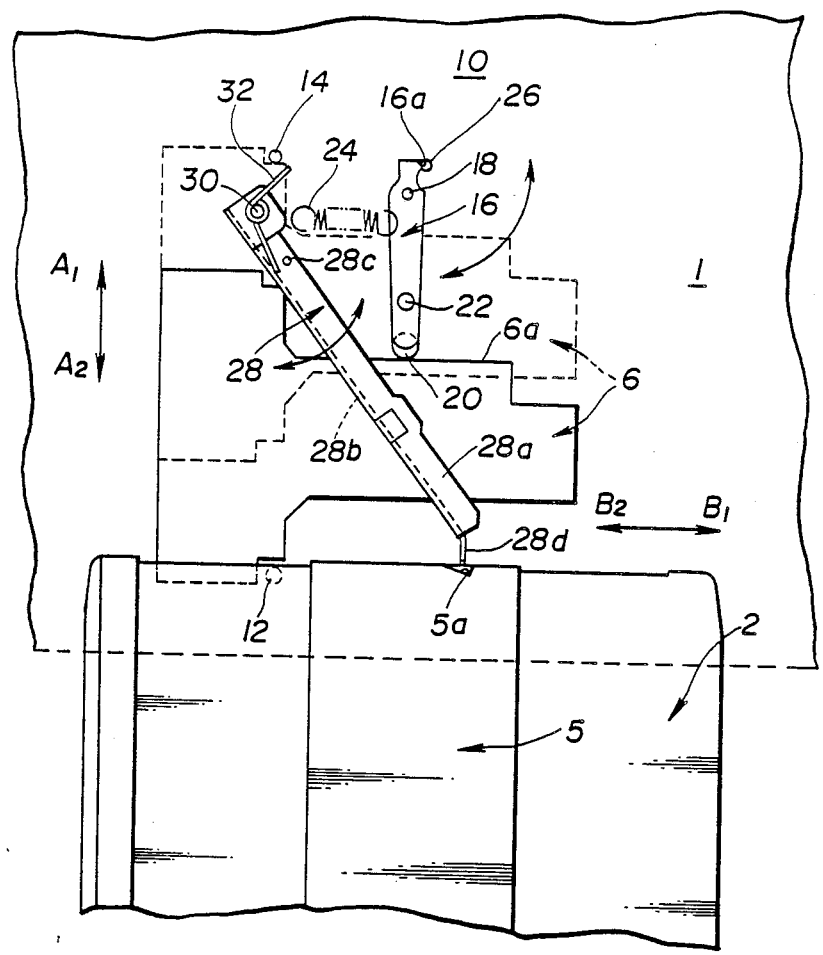
FIG. 2 is a plan view showing first embodiment of the clamping mechanism of the present invention in a state in which the disk is not loaded in the recording/reproducing apparatus.
Figure 3:
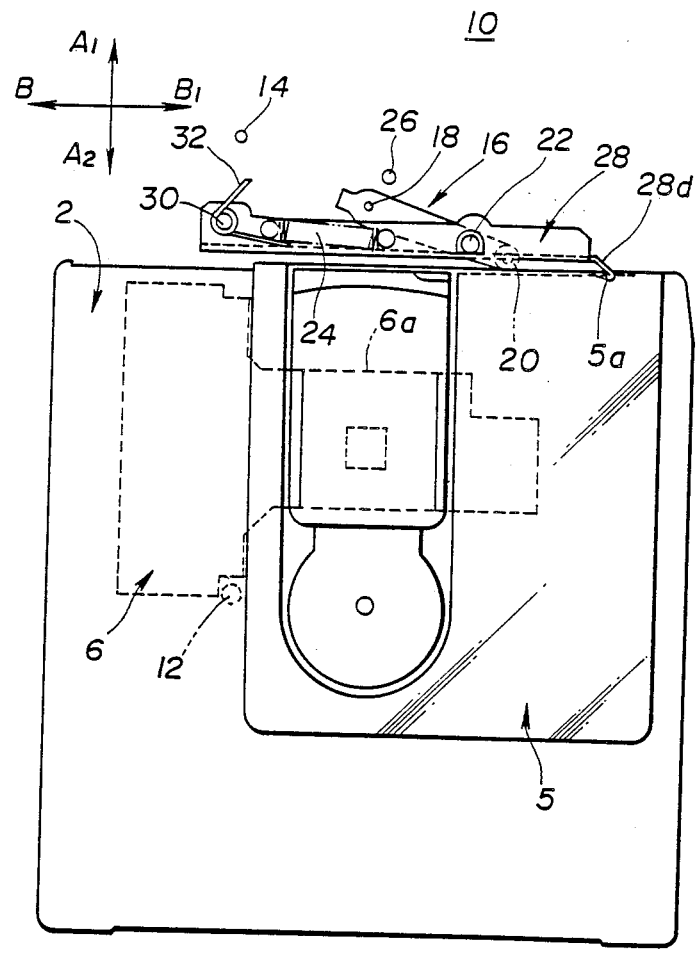
FIG. 3 is a plan view similar to FIG. 2 in which the disk is fully loaded in the apparatus.

Next, a first embodiment of the clamping mechanism of the present invention will be described with reference to FIGS. 2 and 3 in which FIG. 2 shows a clamped state and FIG. 3 shows an unclamped state. For the sake of the clarity of the drawing, the holder 1 shown in FIGS. 1(A) and (B) is omitted from the drawings. Referring to the drawings, a clamping mechanism 10 which is the first embodiment of the clamping mechanism of the present invention is disposed in the body 4 of the recording/reproducing apparatus for clamping the carriage responsive to the movement of a shutter actuating mechanism which also actuates the clamping mechanism. The carriage 6 carries the optical head thereon and is movable in directions A1 and A2 shown in the drawings along a guide rail and driving means (not illustrated) provided on the body 4 of the apparatus. Further, a pair of pins 12 and 14 are disposed on the body 4 so as to limit the extent of movement of the carriage 6 in the directions A1 and A2. More specifically, the carriage 6 can move between a position shown in FIG. 2 by a solid line in which the carriage 6 is abutted to the pin 12 and a position shown in FIG. 2 by a broken line in which the carriage 6 is abutted to the pin 14. The former position will be referred to as a clamping position. When the apparatus is delivered from a factory, the carriage 6 is located at the clamping position. Further, when the cartridge 2 is removed from the apparatus, the carriage 6 is driven by the not illustrated driving means to the clamping position.

FIG. 2 shows a clamp lever 16 which constitutes the essential part of the present invention. The lever 16 is held rotatably on a pin 18 provided on the body 4 of the apparatus in a plane substantially parallel to a plane along which the carriage is moved and carries a roller 20 on its first end as illustrated in FIG. 2. Further, the lever has a pin 22 between the pin 18 and the roller 20. The lever 16 is urged by a spring 24 in a clockwise direction but its further movement beyond the state shown in FIG. 2 in the clockwise direction is restricted by a pin 26 provided on the body 4. Thus, the other end 16a of the lever 16 is engaged with the pin 26. The position of the lever 16 as shown in FIG. 2 will be referred to as a restricted position.

In this restricted position, the clamp lever 16 extends generally perpendicularly to a side 6a of the carriage 6 located in the clamping position, and the roller 20 at the end of the arm 16 contacts tangentially with the side 6a of the carriage 6 and urges the carriage towards the direction A2. Thus, when the carriage 6 is in the clamping position and the lever 16 is in the restricted position as shown in FIG. 2, the movement of the carriage 6 in the direction A2 is prohibited by the pin 12 and the movement of the carriage 6 in the direction A1 is prohibited by the lever 16. Thus, the carriage 6 is securely fixed in the apparatus.

The clamping of the carriage 6 by the lever 16 is released by a lever 28 which constitutes the clamping mechanism 10. This lever 28 is also used for actuating the protective shutter 5 provided on the disk cartridge 2.

The lever 28 is held rotatably on a pin 30 provided on the holder 1 (not shown in FIGS. 2 and 3) which accepts the insertion of the cartridge 2 when the cartridge 2 is loaded on the apparatus, and rotates in a plane substantially parallel to the plane in which the lever 16 is rotated. The lever is made from an elongated member having a generally L-shaped cross section and comprises a top plate portion 28a and a side plate portion 28b. Such a L-shaped member is easily formed by bending an elongated plate member. Further, the pin 30 is mounted with a torsion spring 32 which urges the lever 28 in the clockwise direction. The lever 28 has a pin 28c projecting upwards from the top plate portion 28a and the rotation of the lever 28 towards the clockwise direction is restricted at the state shown in FIG. 2 by the engagement of the pin 28c with a corresponding groove formed in the holder 1 which is not illustrated in FIG. 2. Further, the lever 28 carries on its end a projection 28d adapted to be engaged with a corresponding depression 5a provided on the shutter 5.

In the mechanism 10 as described, the lever 28 is rotated in the clockwise direction when the cartridge 2 is not loaded on the apparatus. In other words, the lever 28 is disengaged from the clamp lever 16 which, on the other hand, is located in the restricted position and clamps the carriage 6. Thus, the clamping mechanism of the present invention clamps the carriage 6 by the clamp lever 16 when the cartridge 2 is not loaded on the apparatus. In other words, the carriage 6 is clamped whenever the cartridge 2 is removed from the apparatus and the damage to the recording/reproducing head carried on the carriage 6 as well as to the cartridge 2 at the time of transportation of the apparatus including the delivery from the factory is positively prevented. Further, as the clamping of the carriage 6 is made automatically by the clamp lever 16, the clamping of the carriage does not require complicated operation as is hitherto required, and the possibility that the user mistakenly assumes that the apparatus is in failure when the carriage does not move due the unreleased clamping is eliminated. Thus, the apparatus incorporating the clamping mechanism of the present invention is easy to handle.

Next, the operation of the clamping mechanism when the cartridge 2 is loaded on the apparatus will be described. As previously described with reference to FIGS. 1(A) and (B), the cartridge 2 is inserted to the holder 1 in the apparatus in the direction A1. Responsive to the insertion of the cartridge 2, the projection 28d at the end of the lever 28 engages with the corresponding depression 5a provided on the shutter 5 of the cartridge. With further insertion of the cartridge 2 into the holder 1 in the direction A1, the lever 28 is rotated in a counterclockwise direction against the action of the spring 32 and the shutter 5 is displaced in the direction B1 shown in FIGS. 2 and 3.

Responsive to the rotation of the lever 28 in the counterclockwise direction, the side plate portion 28b engages with the pin 22 on the clamp lever 16 and pushes the lever in the direction A1. As a result of the force pushing the lever in the direction A1, the clamp lever 16 is rotated in the counterclockwise direction against the action of the spring 24, and the roller 20 is disengaged from the side 6a of the carriage 6. Thus, the clamping of the carriage 6 by the clamp lever 16 is released.

FIG. 3 shows the clamping mechanism 10 in the state in which the cartridge 2 is fully inserted into the holder 1. As can be seen from the drawing, the lever 28 extends generally in parallel to the front side of the cartridge 2 and the shutter 5 is fully opened. Further, the lever 16 is rotated as a result of rotation of the lever 28 and is displaced to a position in which the lever 16 does not obstruct the movement of the carriage 6 in the A1 and A2 directions for recording and reproducing. Thus, the movement of the carriage 6 is not obstructed by the clamping mechanism when the cartridge 2 is inserted to the apparatus. Further, the clamping mechanism 10 is moved in the reversed direction when the cartridge 2 is removed from the apparatus. As the movement of the each part of the mechanism 10 at the time of removal of the cartridge from the apparatus is exactly the reversal of the movement as described heretofore, the description of the operation at the time the cartridge is removed will be omitted.

Figure 4:
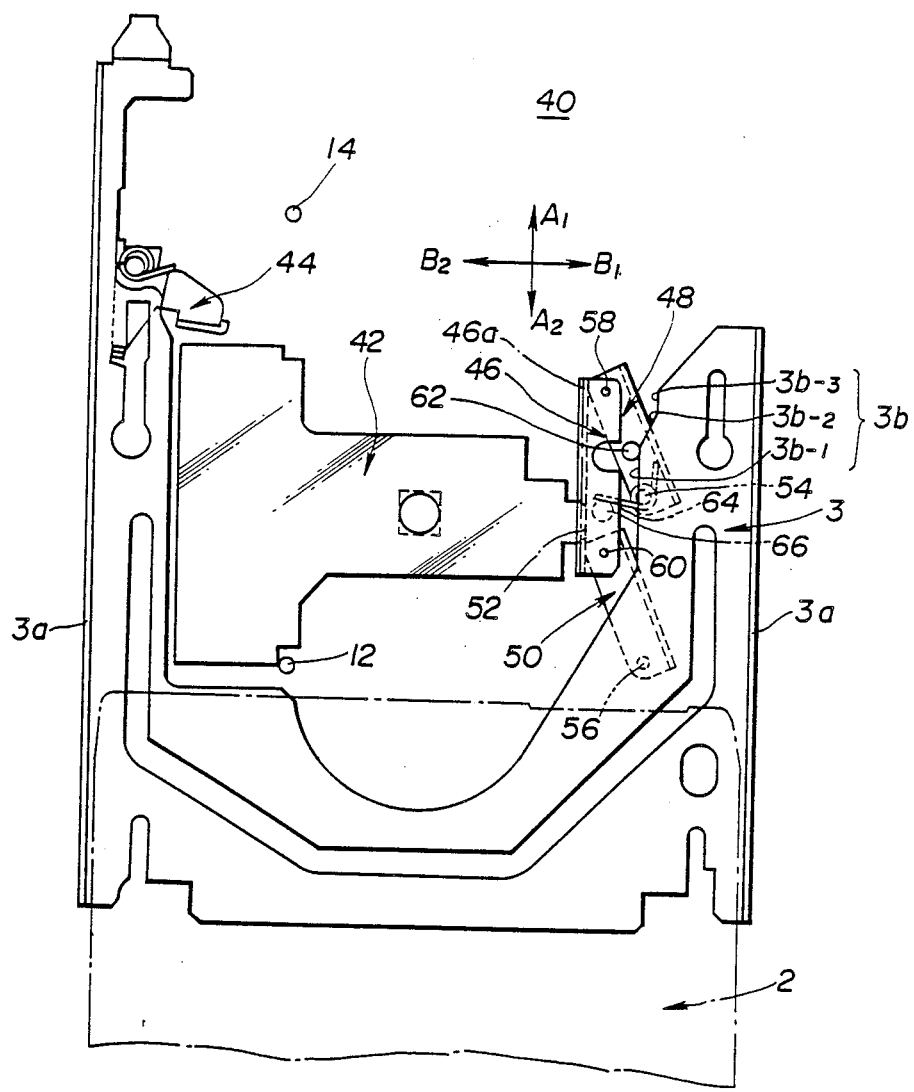
FIG. 4 is a plan view showing a second embodiment of the clamping mechanism according to the present invention in a state in which the disk is not loaded in the apparatus.
Figure 5:
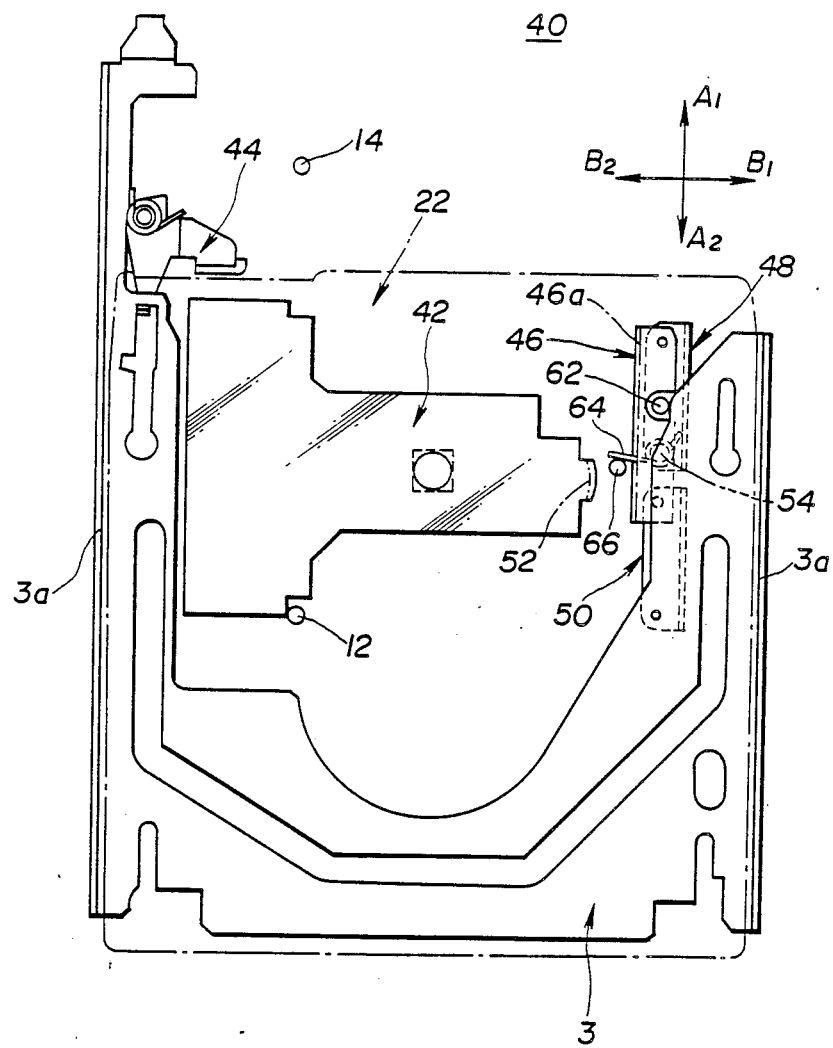
FIG. 5 is a plan view similar to FIG. 4 showing a state in which the disk is fully loaded in the apparatus.

Next, a second embodiment of the present invention will be described with reference to FIGS. 4 and 5. Referring to the drawings, a clamping mechanism 40 which is the clamping mechanism of the present invention clamps a carriage 1 in response to the movement of the slider 3. FIG. 4 shows the clamping mechanism in the clamped state and FIG. 5 shows the clamping mechanism in which the clamp is released. As the slider 3 is already described with reference to FIGS. 1(A) and (B), the description thereof will not be repeated.

The clamping mechanism 40 generally comprises three link arms 46, 48 and 50 provided on the slider 3 and a teeth 52 formed on a carriage 42 at its right side in FIG. 4. The carriage 42 is constructed substantially identical to the carriage 6 of FIG. 2 except for the teeth 52 and further description thereon will be omitted.

The link arm 48 and the link arm 50 have respective ends held rotatably on pins 54 and 56 provided on the body 4 and further have the other ends held rotatably on pins 58 and 60 provided on the link arm 46. Thus, the link arm 46 displaces relative to the slider 3 in the B1 and B2 directions responsive to the movement of the link arms 48 and 50. The link arm 46 is formed with another teeth 46a so as to oppose the carriage 42 and so as to mesh with the teeth 52 formed on the carriage 42.

Further, the link arm 48 is provided with a pin 62 fixedly thereto and the pin 54 is wound with a torsional spring 64. An end of the torsional spring 64 is engaged with a pin 66 provided on the body 4 of the apparatus and the other end of the spring 64 is engaged with the link arm 48. The torsional spring 64 thus urges the link arm 48 in the clockwise direction about the pin 54. Further, the rotation of the link arm 48 in the clockwise direction is restricted by the engagement of the pin 62 on the link arm 48 with an inner boundary 3b of the slider 3. It is noted that the inner boundary 3b of the slider 3 is defined by a marginal part 3b-1 to which the pin 62 is engaged when the cartridge 2 is not loaded, a sloped marginal part 3b-2 continuing to the marginal part 3b-1, and another marginal part 3b-3 to which the pin 62 is engaged when the cartridge is fully inserted or loaded.

In the state in which the rotation of the link arm 48 is restricted by engagement of the pin 62 with the marginal part 3b-1, the aforementioned teeth 46a formed on the link 46 meshes with teeth 52 on the carriage 42 and the movement of the carriage 42 is restricted. This state will be referred to hereinafter as the clamped state. Thus, when the cartridge 2 is not loaded and the slider 3 is displaced in the A1 direction, the movement of the carriage 42 in the A1 and A2 directions is restricted by the engagement of the teeth 52 with the teeth 46a and the carriage 42 is fixed. Thus, the carriage 42 is firmly fixed when delivering the apparatus from the factory or when transporting the apparatus from one place to another place as long as the cartridge 2 is not loaded on the apparatus, and the damage to the recording/reproducing head as well as to the carriage 42 is reliably avoided. Further, the clamping operation is simplified.

Furthermore, by choosing the length of the link arm 46 and thus the length of the teeth 46a formed thereon such that the arm 46 extends for a length covering the movement of the carriage 42 in the A1 and A2 directions, the carriage 42 can be fixed at an arbitrary position in the range of movement of the carriage 42.

Next, the operation of the clamping mechanism 40 when the cartridge 2 is loaded on the apparatus will be described.

Responsive to insertion of the cartridge 2 in the holder 1 to a predetermined position, the front side of the cartridge 2 pushes a lock lever 44 which locks to movement of the slider 3 in the A1 and A2 directions. Thus, the slider 3 becomes free to move in these directions and is moved in the A2 direction by an urging means not illustrated.

Responsive to the movement of the slider 3, the pin 62, which is engaged with the marginal part 3b-1 of the boundary 3b in the unloaded state of the cartridge 2, moves along the sloped marginal part 3b-2 relatively to the slider 3 and reaches the state in which the pin 62 is engaged with the marginal part 3b-3. As aforementioned, the link arm 48 is urged in the clockwise direction by the torsional spring 64 about the pin 54. Thus, the link arm 48 is rotated in the clockwise direction responsive to the movement of the pin 62 from the state in which it is engaged with the marginal part 3b-1 to the state in which it is engaged with the marginal part 3b-3. As a result of the rotation of the link arm 48, the link arm 46 is displaced in the B1 direction away from the carriage 42 and the clamping of the carriage 42 by the clamping mechanism 40 is released. Thus, the carriage 42 becomes free to move in the A1 and A2 directions.

When removing the cartridge 2 from the apparatus, the aforementioned procedure is repeated in the reversed order. As this procedure is an exact reversal, the description thereof will be omitted.

Next, a third embodiment of the present invention will be described with reference to FIGS. 6 through 8. Referring to the drawings, a clamping mechanism 80, which is the third embodiment of the present invention, generally comprises a teeth 84 disposed below the carriage 82, a clamp lever 86 for clamping the carriage 82 by engaging with the teeth 84, and a release lever 88 for disengaging the clamping of the carriage 82 by displacing the clamp lever 86.

Figure 6:
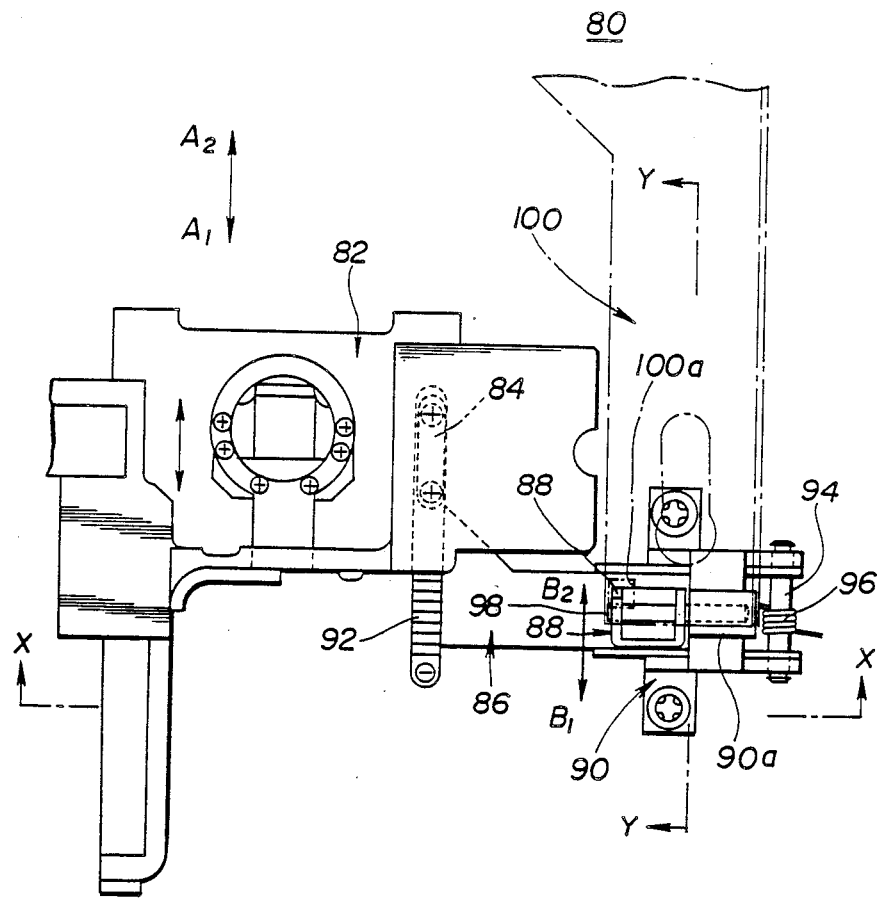
FIG. 6 is a plan view showing a third embodiment of the clamping mechanism of the present invention.
Figure 7:
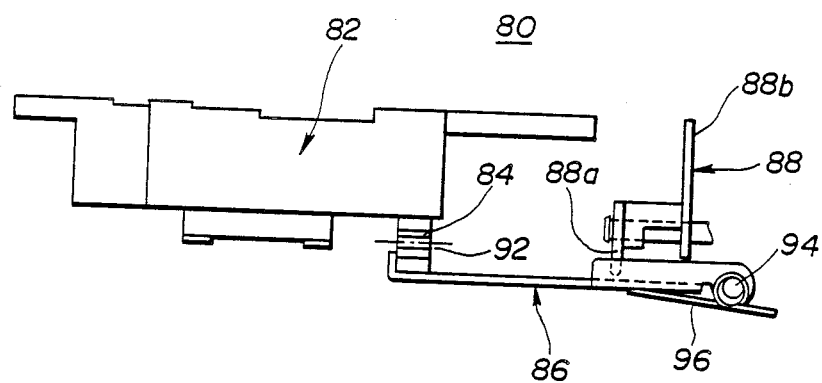
FIG. 7 is an elevational view of the clamping mechanism of FIG. 6 seen in X—X directions of FIG. 6.
Figure 8:
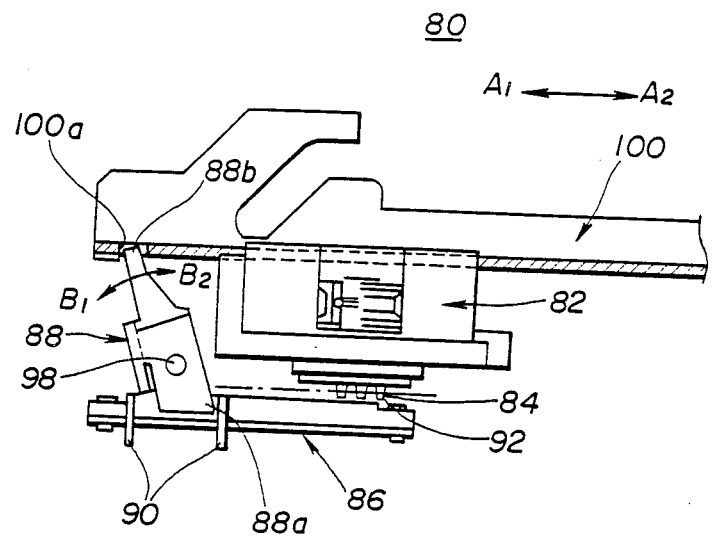
FIG. 8 is an elevational view of the clamping mechanism of FIG. 6 seen in Y—Y directions of FIG. 6.

The clamp lever 86 is provided rotatably on a holder 90 which in turn is provided fixedly on the body 4 of the apparatus, and carries a teeth 92 at its left end as shown in FIGS. 6 and 7. The teeth 92 is designed so as to engage with a corresponding teeth 84 formed on a lower side of the carriage 82. The clamp lever 86 is held rotatably on a pin 94 provided on the holder 90, and the pin 94 is wound with a torsional spring 96. The spring 96 urges the clamp lever 86 continuously in the clockwise direction in FIG. 7 so that the teeth 92 is meshed with the teeth 84.

The release lever 88 is disposed above the clamp lever 86 and is held rotatably on a pin 98 held in a bearing part 90a formed integrally with the holder 90. This release lever 88 comprises an engaging part 88a extending downwards for engagement with the clamp lever 86 and an actuation lever part 88b extending upwards for engagement with an actuating opening 100a formed on a slider 100.

The slider 100 performs a movement which is substantially identical to the slider 3 described with reference to FIGS. 1(A) and (B). Thus, the slider 100 is shifted in the A1 direction when the cartridge 2 is not loaded on the apparatus and is shifted in the A2 direction when the cartridge 2 is inserted. Responsive to the movement of the slider 100 in the A2 direction, the holder 90 is lowered and the disk accommodated is the cartridge is transported to the predetermined position for recording and/or reproducing. Further, responsive to the movement of the slider 100 in the A1 direction, the holder 90 is moved upwards and the cartridge is ejected. Further, the actuation lever part 88b of the release lever 88 is engaged with the opening 100a of the slider 100 as aforementioned and the lever 88 is rotated responsive to the movement of the slider in the A1 and A2 directions.

Figure 9:
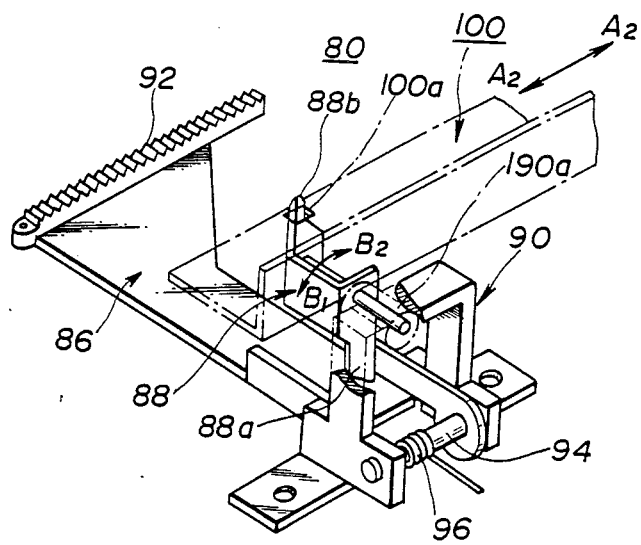
FIGS. 9-11 are diagrams showing the clamping mechanism of FIG. 6 in a released state.

Next, the positional relationship between the clamp lever 86, clamp release lever 88 and the slider 100 will be described with reference to FIG. 9 together with the operation of the clamping mechanism 80. It should be noted that FIGS. 6 through 8 show the unloaded state of the cartridge. In this unloaded state, the slider 100 is displaced in the A1 direction, and the clamp release lever 88 is rotated in the B1 direction. Further, the engaging part 88a formed on the clamp release lever 88 is not engaged with the clamp lever 86. Thus, the clamp lever 86 is rotated in the clockwise direction by the torsional spring 90 and the teeth 92 is engaged with the corresponding teeth 84. Thus, the carriage 82 is firmly fixed by the clamp lever 86. Therefore, the clamping mechanism 40 reliably fixes the carriage 82 whenever the cartridge is not loaded including the time in which the apparatus is delivered from the factory or transported from one place to another place, and the damage to the carriage 82 is prevented and the handling at the time of applying and releasing the clamping is simplified.

In this embodiment, too, the carriage 82 can be clamped at an arbitrary position in the moving range of the carriage 82 by choosing the length of the teeth 84 and the teeth 92 such that their length cover the moving range of the carriage 82.

Figure 10:
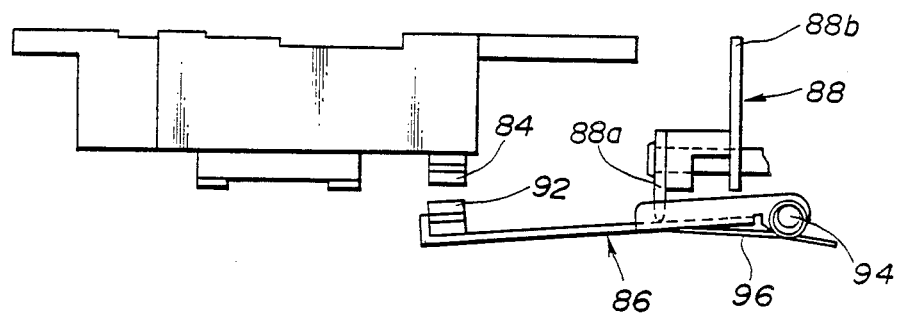
Figure 11:
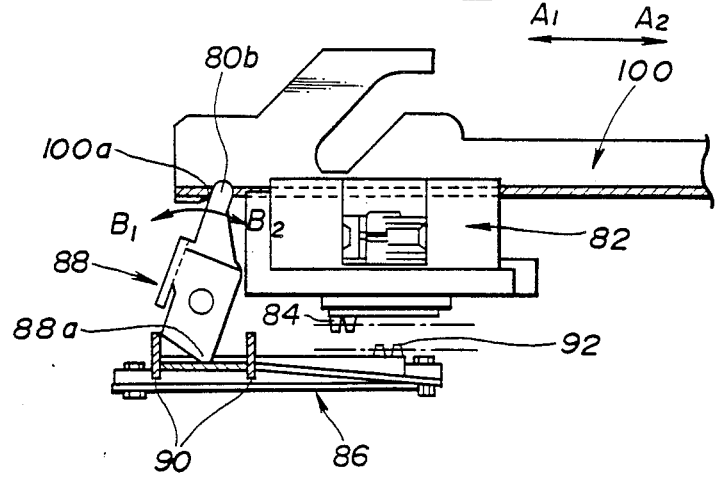

When the cartridge is inserted to the apparatus in such a state, the slider 100 is shifted in the A2 direction. Responsive to this movement of the slider 100, the release lever 88 is rotated in the B2 direction and the engaging part 88a pushes an upper surface of the clamp lever 86 downwards. Responsive to this, the clamp lever 86 is rotated against the action of the torsional spring 90 and the teeth 92 is disengaged from the teeth 84. Thus, the carriage 82 is released and becomes free to move in the A1 and A2 directions. Such a released state is illustrated in FIGS. 10 and 11.

It should be noted that the clamping mechanism 80 clamps the carriage 82 by the engagement of the teeth 84 and the teeth 92 which is somewhat similar to the clamping mechanism 40 in the second embodiment. In the mechanism 40 of the second embodiment, however, there is a problem in that the inner boundary 3b of the slider 3 has to be formed to a predetermined shape (see FIGS. 4 and 5) with a high precision and the position of the pin 62 has to be chosen carefully so that the pin 62 engages with the inner boundary 62 properly and the carriage is clamped and released properly. In the clamping mechanism 80 of the third embodiment, in contrast, reliably engaging and disengaging operation is obtained by a simply adjustment of the actuation lever part 88b and the opening 100a.

It should be noted that the clamping mechanism 10, 40 and 80 of the present invention is suitable for use in the apparatus using a linear motor for driving the carriage.

Further, the present invention is not limited to these embodiments, but various variations and modifications may be made within the scope of the present invention.

What is claimed is:

1. A clamping mechanism for clamping a carriage carrying a recording/reproducing head of an information recording/reproducing apparatus, said recording/reproducing head being adapted for recording and/or reproducing an information signal on and from a disk-shaped rotary recording medium accommodated in a cartridge when the disk-shaped rotary recording medium is loaded in the information recording/reproducing apparatus together with the cartridge, said carriage being provided movably in a body of the information recording/reproducing apparatus for moving the recording/reproducing head carried thereon across the disk-shaped rotary recording medium, said clamping mechanism comprising:

clamping means provided movably on the body of the recording/reproducing apparatus between a clamped state in which the clamping means is engaged with the carriage so that the carriage is fixed to said clamping means and a released state in which the clamping member is disengaged from the carriage so that the carriage is free to move relative to said clamping means; and actuation means provided movably on the body of the recording/reproducing apparatus between a first state and a second state, said actuation means comprising a holder for accommodating the cartridge when the disk-shaped rotary recording medium is loaded in the apparatus, said actuation means being constructed such that the actuation means makes a mechanical engagement with the cartridge when the cartridge is accommodated in the holder and such that the actuation means assumes the first state and the second state respectively in response to removal and insertion of the cartridge from and into the holder, said actuation means urging said clamping means to said clamped state when the actuation means is in said first state and said actuation means urging said clamping means to said released state when said actuation means is in said second state.

2. A mechanism as claimed in claim 1 in which said clamping means comprises a clamping lever held rotatably on the body of the apparatus between said clamped state and released state.

3. A mechanism as claimed in claim 2 in which said clamping lever has a first end held rotatable in a plane substantially parallel to a plane along which the carriage is moved and a second, opposite end, said clamping lever carrying a roller on the second end, said roller making a tangential contact with a side of the carriage when the clamping lever is rotated to said clamped state.

4. A mechanism as claimed in claim 3 in which said clamping lever is rotatable in a plane substantially perpendicular to a plane along which the carriage is moved and carries a toothed part on the second end, said clamping lever is moved upwards when the clamping lever is moved from said released state to said clamped state and said toothed part makes a contact with a bottom side of the carriage when the clamping lever is moved from said released state to said clamped state.

5. A mechanism as claimed in claim 4 in which said actuation means comprises an actuation arm held rotatably on the body of the apparatus between said first state and said second state in a plane substantially perpendicular to the plane in which the clamping lever is moved and further to the plane along which the carriage is moved, said actuation arm being disengaged from the clamping lever when the actuation arm is in said first state and pushing the clamping lever downwards such that the toothed part provided on the clamping lever is disengaged from the bottom surface of the carriage when the actuation arm is in said second state, and a slidable body provided movably on the body of the apparatus between a first position when the cartridge is not loaded in the apparatus and a second position when the cartridge is loaded in the apparatus, said slidable body being engaged with said actuation arm and moving the actuation arm to said first state when the slidable body is in said first position and moving the actuation arm to said second state when the slidable body is in said second position.

6. A mechanism as claimed in claim 5 in which said slidable body is urged to said second position, and said actuation means further comprises a lock mechanism for locking the slidable body at the first position when the cartridge is not loaded, and said lock mechanism releases the locking of the slidable body when abutted with the cartridge loaded in the apparatus.

7. A mechanism as claimed in claim 5 in which said slidable body is urged to said second position and is held at said first position by a lock mechanism which is released when abutted with the cartridge loaded in the apparatus.

8. A mechanism as claimed in claim 3 in which said actuation means comprises a resilient means for urging said clamping lever to said clamped state, an actuation arm held rotatably on said holder between said first state and said second state in a plane substantially parallel to the plane in which the clamping lever is rotated, a pin provided on the clamping lever so as to be engaged with the actuation arm when the actuation arm is moved from said first state to said second state, and resilient means urging said actuation arm to said first state, said actuation arm being abutted with the cartridge and moved from said first state to said second state when the cartridge is inserted into the holder.

9. A mechanism as claimed in claim 1 in which said clamping means is a link mechanism comprising first and second link arms disposed generally in parallel to one another and having respective first ends held rotatably on the body of the apparatus and a link member connecting the other ends of said first and second link arms, and said link mechanism is movable between said clamped state in which said link member is engaged with a side of the carriage and said released state in which said link member is disengaged from the carriage responsive to the rotation of said link arms.

10. A mechanism as claimed in claim 9 in which said link member is provided with teeth so as to engage with a side of the carriage when the link mechanism is in said clamped state.

11. A mechanism as claimed in claim 9 in which said actuation means comprises a pin provided on either one of said first and second link arms, a resilient means for urging said link mechanism to said released state and a slidable body provided on the body of the apparatus movably to first and second positions, said slidable body being defined with first and second surfaces such that the first surface is engaged with said pin and urges the link mechanism to said clamped state when the slidable body is in said first position and that the second surface is engaged with the pin of the link mechanism and allowing the movement of the link mechanism to said second state by the action of said resilient means when the slidable body is in said second position.

* * * * *